Sept. 28, 1954

L. A. WILSON 2,690,300

DOCUMENT SENSING DEVICE

Original Filed Aug. 19, 1950

INVENTOR
L. A. WILSON,

BY
J W Armbruster
ATTORNEY

Patented Sept. 28, 1954 2,690,300

UNITED STATES PATENT OFFICE 2,690,300

DOCUMENT SENSING DEVICE

Lawrence A. Wilson, Garden City, N. Y., assignor to International Business Machines Corporation, New York, N. Y., a corporation of New York Original application August 19, 1950, Serial No. 180,354. Divided and this application October 20, 1951, Serial No. 252,389

5 Claims. (Cl. 235—61.11)

Figure 1:
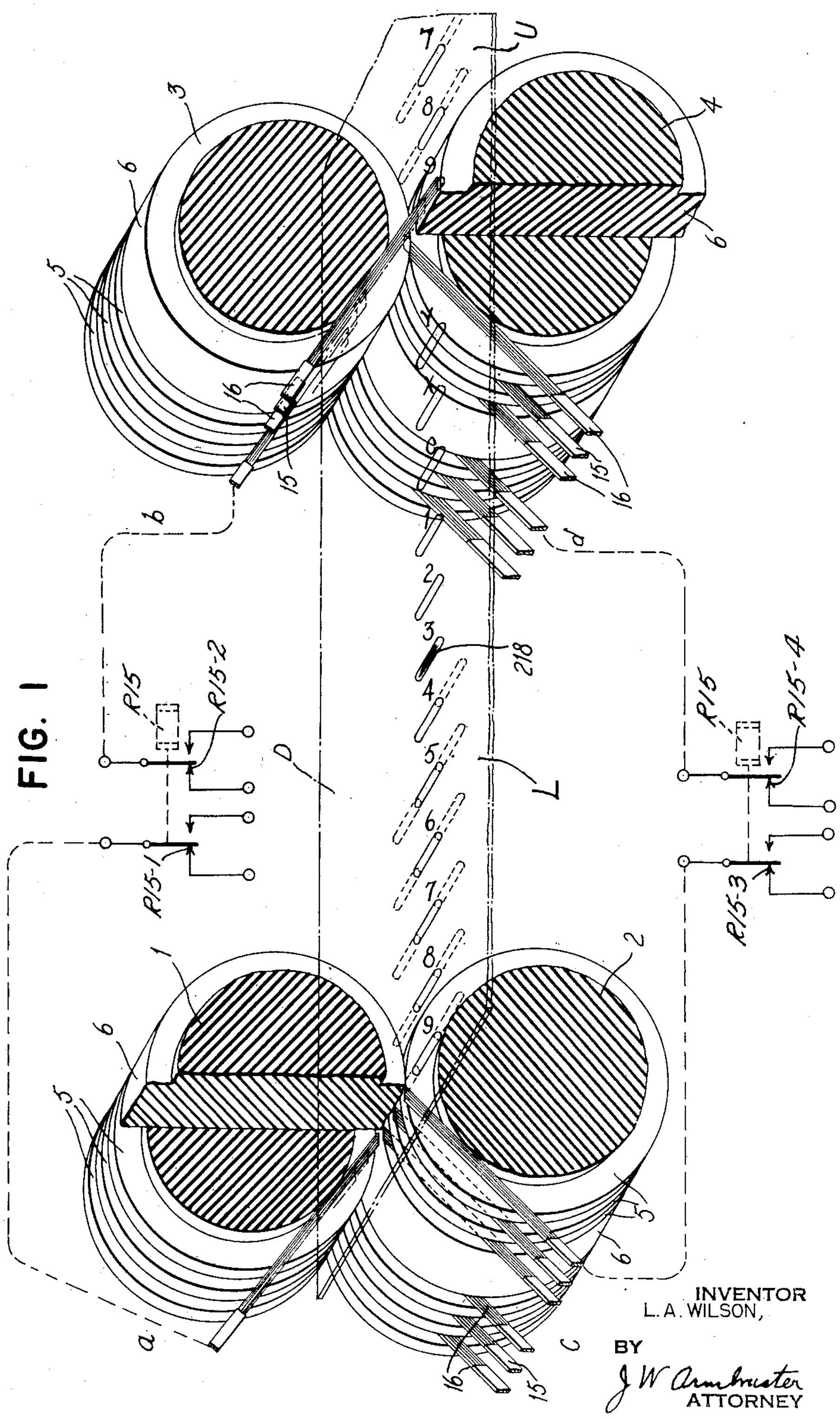

This application is a division of the copending parent application Serial No. 180,354, filed on August 19, 1950, for a Mark Sensing Reproducer.

The invention relates generally to record-sensing devices and more specifically to an arrangement of four lines of sensing brushes for sensing both faces of a marked document.

The invention is illustrated in connection with census work in which a large double-decked record is marked on both sides by the census taker and forms the original document which is sensed to control the perforation of standard IBM-type accounting machine cards.

When a record such as a census slip or meter record is made by pencilling in areas indicative of data readings, it is advisable that such a marked record should be larger than the well-known form of 80-column perforated card known as an IBM card. By using a record area approximately twice as large as the usual tabulating card and by using both back and front of such a document it is possible to devote approximately four times the area of a perforation index point for the pencilled area of a single notation for the census record or meter reading. Therefore, by providing a mechanism for sensing such a large record and controlling perforation of a standard record it is made easier for the census taker to mark the original document.

The large record is proportioned to be equal in size to two standard cards plus a middle strip equal to the separation area between successive cards as they pass through a standard reproducer. In other words, the marked document when passed through a standard reproducer takes the place of two successive perforated cards and is analyzed simultaneously in four places, i. e., the double decks and both faces of the document.

A standard tabulating card has a height equivalent to thirteen index point spacings. These are also referred to at times as the cycle points of the machine, i. e., the ten digit cycle points, two special position cycle points and the one extra cycle point representative of the marginal areas at the top and bottom of the card. As such standard cards pass through the reproducer they are separated by a space equal to the distance between two successive index points. Therefore, the reproducer operates on a fourteen-point cycle, thirteen points of which is represented by the card height and one point by the separation between successive cards. In conformity with such proportions, the present large marked document is proportioned with a height equal to twenty-seven cycle points which includes double spacing of twelve data-receiving points, two marginal points and one spacing point, and therefore the large record is exactly two and one-thirteenth times the height of a standard record.

An object of the invention is to provide sensing means for simultaneously sensing both decks and both sides of a marked document so that in effect the marked record is equivalent to one eighty-column perforated card. In the sensing device two pairs of lines of sensing brushes are spaced apart thirteen cycle points to sense both decks and sides simultaneously as they cooperate with one marked document. The sensing brushes for opposite sides of the document are staggered in arrangement and the mark-receiving areas are also alternated so that no mark on the top surface is opposite a mark on the bottom surface. The marked document is arranged with four sets of data-receiving areas, two decks on one side and two decks on the other side. Each deck includes twenty columns of twelve index points per column making a total of eighty columns of standard twelve index point positions. The sensing mechanism has four lines of sensing brushes, two lines for the top surface of the record and two lines for the bottom surface of the record. In each line of brushes there are sixty individual brushes with three brushes per set at an index point and twenty index points in a row. Of the three brushes for an index point, the central brush is wired as the common contact point and the two outer brushes are connected together to form the other end of the circuit which is established through either of the two, through the mark to the central brush. Each brush is spaced and guided by grooves in an insulation rod, said rod being opposite the brushes facing in the other direction and furnishing a blank space between the sets of grooves on which the brush tips rest and become insulated when no record is in the sensing unit. Therefore, the alternation of index point positions on both sides of the document not only improves the chance of making a distinctive mark but also provides an economical way of insulating the brushes in their active and inactive positions.

Other objects of the invention will be pointed out in the following description and claims and illustrated in the accompanying drawings, which disclose, by way of example, the principle of the invention and the best mode, which has been contemplated, of applying that principle.

In the drawing:

Fig. 1 is a perspective view showing the document sensing unit and revealing how the alternately notched rods separate the sets of mark sensing brushes and provide platforms for the tips of the brushes.

Referring to Fig. 1, it is seen that the document D is proportioned with two decks U and L of marked information index points there being twelve possible points in each column of a deck in the standard IBM fashion and there being twenty such columns in each of the decks. Each mark-receiving area is defined by a printed rounded rectangular shape to receive a conductive pencil mark. The same arrangement applies for the other face of document D with the other two decks also each providing twenty columns of index point positions.

In order to adapt the record for census work the columns are grouped for various designations such as place of birth, language spoken, occupation, etc. The areas for receiving marks indicative of the data being collected are outlined with single and grouped printed areas and marked with digits to further code the information. It is noted that such mark-receiving areas are not superimposed on the front and back faces of the document but instead are alternated in placement so that they provide a staggered arrangement, with the document observed on end. In other words, a column of points on the back face is interspersed between two columns of index points on the front face. Therefore, the marks made on one face of the document will occur in comparatively free areas and not interfere with brushes arranged to sense two adjacent areas of the other face of the record.

The marks are made with a special pencil with lead having good electrical conductive qualities so that when a three-pronged brush set is drawn over the moving document and a mark is encountered by the brush set a circuit is established between a central brush 15 and conducted to either or both of the outer brushes 16 of the set.

The large document D is proportioned to take the place of two standard cards as they appear when fed in succession through a card controlled machine. The document is slightly greater in height than the two cards, the difference being represented by the space which is equivalent to one index point of space or one cycle point space which is the separation distance existing when standard cards are directed through the reading station of the standard reproducer. Therefore, the single large document D is adapted to take the place of two successive cards in the reproducer, and when read simultaneously on all four decks it is in effect a control equivalent to one eighty-column perforated card. The length or width of the large document is exactly that of a standard card and, therefore, the general data-receiving area both back and front is the equivalent roughly of four tabulating cards. Therefore, the marking area is approximately four times that of the perforation receiving area of a standard card and this provides plenty of room for the marks and for the notations associated therewith.

Referring to Fig. 1 it is noted that the four lines of sensing brushes *a*, *b*, *c* and *d* are arranged in a novel fashion and guided and separated by notched insulation rods 1, 3, 2 and 4. In each pair of oppositely facing lines of brushes, such as the lines *a* and *c*, the brushes *a* for the upper side of the pattern document, are guided by the insulation rod or member 1 but impinge upon rod 2 which also acts as a guide for the brushes *c* of the lower set. Thus each rod serves for dual purposes of insulating two lines of brushes. Each insulation rod is notched at twenty regular wide intervals with three closely spaced notches 5 for the brush set of one index point. The three closely mounted brushes of a set are wired electrically so that when a document mark spans the tips, a central brush 15 is caused to conduct current from either of the outer brushes 16 and a punch control circuit is established. The sets of brushes are staggered in arrangement, i. e., a top brush set is located between two lower brush sets. In the absence of a document, the tips of the upper brush set normally rest on a blank or unnotched portion 6 of the opposite lower insulation rod. In a similar fashion the lower sets of brushes rest on blank unnotched portions of the opposite upper insulation rod. It is because of the novel arrangement of marked areas in interspersed formation on the pattern document that it is possible to arrange the cooperating sensing devices in such a safe, workable and economical fashion.

The four lines of brushes *a*, *b*, *c* and *d* shown in Fig. 1 are seen to cooperate with the four decks of marked information on both sides of the document D. As the document is moved from left to right, the four lines of brushes simultaneously read all eighty-columns of coded information. Thus the markings are converted into timed impulses for controlling the operation of punch interposer magnets so that eighty columns of information can be perforated in a card at the punch station of a reproducer.

The way the four lines of brushes are each controlled to read only one deck of the record is explained in detail in the parent case, Serial No. 180,354, of which this is a division, and it is sufficent to note here that a class selection relay R15 serves to shift contacts R15-1—R15-4 between the analysis of decks on the same record. In the drawing it is noted that relay R15 shifts or transfers a series of class selection contacts R15-1—R15-4 which are pluggable in a variety of ways between the sockets of the reading brushes and sockets of the punch controls so that various information on the document may be selectively transferred, reproduced or eliminated. For example, if it is desired to eliminate certain document information under class selection control, then the relay R15 is plugged so that upon detection of an X mark related to a certain deck, the contacts R15-1 are shifted and the circuit connections are broken to eliminate the punch control circuit which would otherwise be directed to control a punch magnet. Conversely, for class selection of information, the plugged contact connections are normally open and then, upon operation under X mark control, the contacts of relay R15 serve to make connections between the reading brushes and the punch controls whenever an X mark is found.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device for sensing indicia at index points on both faces of a record element, two lines of sensing brushes, one line for each face of the element, said lines of brushes being directly opposite each other on opposite sides of the element, individual brush sets in said lines, said brush sets being alternated in position in said lines so that a brush set in one line is opposite the space between two brush sets in the other line.

2. A sensing device as set forth in claim 1 with two notched members for spacing and guiding said brush sets of the lines, each brush set fitting in a notch formation in a member, the tips of the brushes of one line normally resting on the unnotched portions of the member for spacing the brushes of the other line.

3. In a device for sensing indicia at index points on both faces of a record element, there being four decks of such index points with two decks on each face of the element, four lines of sensing brushes, one line for each deck of index points, said lines of brushes being paired with lines of a pair being directly opposite each other on opposite sides of the element, said pairs of lines being spaced apart approximately one half the height of the element, individual brush sets in said lines for separate columns of index points, said brush sets being alternated in position in said paired lines so that a brush set of one line is opposite the space between two adjacent brush sets of the opposite line.

4. In a device for sensing conductive marks at index points on both faces of a record element, there being four decks of index points with two decks on each face of the element, a deck comprising twenty columns of index points arranged in the standard digital tabulator card fashion, four lines of sensing brush sets, one line of twenty sets for each deck of index points, said lines of brushes being paired with lines of a pair directly opposite each other on opposite sides of the element, said pairs of lines being spaced apart approximately one half the height of the element, each brush set comprising three individual brushes with a central common brush and outer connected brushes to sense a mark at any point in a column, said brush sets of paired lines being staggered in arrangement with the brush set of one line opposite a space between two adjacent brush sets of the opposite line.

5. A sensing device according to claim 4, characterized by the fact that the height of the record element is $2\frac{1}{13}$ times the height of an ordinary tabulator control type card, said pairs of brush lines being spaced apart $\frac{14}{27}$th of the height of the element, said element being proportioned in height to take the place of two successive ordinary cards and thereby enabling use of all brushes in cooperation with all index points of all decks of the record element within one standard tabulating machine cycle.

References Cited in the file of this patent

UNITED STATES PATENTS

| Number | Name | Date |
|---|---|---|
| 1,214,540 | Greene | Feb. 6, 1917 |
| 2,189,046 | Smith et al. | Feb. 6, 1940 |
| 2,493,848 | Ayres | Jan. 10, 1950 |